United States Patent
Dong et al.

(10) Patent No.: US 6,720,101 B1
(45) Date of Patent: Apr. 13, 2004

(54) SOLID CAGE FUEL CELL STACK

(75) Inventors: Zuomin Dong, Victoria (CA); John J. Y. Shen, Surrey (CA)

(73) Assignee: Palcan Fuel Cell Co. LTD, Burnaby (CA)

( * ) Notice: Subject to any disclaimer, the term of this patent is extended or adjusted under 35 U.S.C. 154(b) by 356 days.

(21) Appl. No.: 09/877,457

(22) Filed: Jun. 8, 2001

(51) Int. Cl.$^7$ ................................................. H01M 8/10
(52) U.S. Cl. ........................... 429/32; 429/34; 429/38; 429/39; 429/37
(58) Field of Search .................. 429/32, 34, 37, 429/38, 39

(56) References Cited

U.S. PATENT DOCUMENTS

| | | |
|---|---|---|
| 4,169,917 A | 10/1979 | Baker et al. |
| 4,276,355 A | 6/1981 | Kothmann et al. |
| 4,430,390 A | 2/1984 | Fekete |
| 4,444,851 A | 4/1984 | Maru |
| 4,508,793 A | 4/1985 | Kumata et al. |
| 4,623,596 A * | 11/1986 | Kamoshita .................. 429/26 |
| 4,755,272 A | 7/1988 | Plowman |
| 5,108,849 A | 4/1992 | Watkins et al. |
| 5,230,966 A | 7/1993 | Voss et al. |
| 5,252,410 A | 10/1993 | Wilkinson et al. |
| 5,378,247 A | 1/1995 | Sasaki et al. |
| 5,470,671 A | 11/1995 | Fletcher et al. |
| 5,484,666 A | 1/1996 | Gibb et al. |
| 5,514,487 A | 5/1996 | Washington et al. |
| 5,532,073 A | 7/1996 | Hirata et al. |
| 5,541,015 A | 7/1996 | Tajima et al. |
| 5,549,983 A | 8/1996 | Yamanis |
| 5,686,200 A | 11/1997 | Barton et al. |
| 5,858,569 A | 1/1999 | Meacher et al. |
| 6,210,823 B1 | 4/2001 | Hatoh et al. |
| 6,428,921 B1 * | 8/2002 | Grot ............................ 429/37 |

FOREIGN PATENT DOCUMENTS

| | | |
|---|---|---|
| DE | 44 42 285 C1 | 2/1996 |
| GB | 2 296 124 | 6/1996 |
| JP | 6-68885 | 3/1994 |
| WO | PCT/GB99/01169 | 11/1999 |

OTHER PUBLICATIONS

Prater, Keith B., Polymer Electrolyte Fuel Cells: A Review of Recent Developments, Journal of Power Sources, 1994, pp. 129–144, vol. 51, Elsevier Science S.A., Lausanne, Switzerland. No month available.

(List continued on next page.)

*Primary Examiner*—Bruce F. Bell
(74) *Attorney, Agent, or Firm*—Robert H. Barrigar

(57) ABSTRACT

A solid-cage ambient-pressure PEM fuel cell stack having internal manifolds for the fuel gas and configured for accepting oxidant gas and cooling fluid via external manifolds/plena is disclosed. The fuel cell stack is contained in a solid cage comprised of a bottom end plate, a top end plate and four L-shaped struts. Each strut is attached at each end to a corner of the end plates so as to form a rigid rectangular parallelepiped cage, within which the fuel cell stack is contained. A pressure plate is disposed between the fuel cell stack and the top end plate. The pressure plate may be displace downwards, typically by way of an array of jack screws, so as to compress the fuel cell stack between the pressure plate and the bottom end plate. The vertical corners of the fuel cell stack engage the inside corners of the struts to further support the fuel cell stack.

29 Claims, 16 Drawing Sheets

OTHER PUBLICATIONS

Prater, Keith B., The Renaissance of the Solid Polymer Fuel Cell, Journal of Power Sources, 1990, pp. 239–250, Vol 29, Elsevier Sequoia, Lausanne, Switzerland. No month available.

Prater, Keith B., Solid Polymer Fuel Cell Developments at Ballard. Journal of Power Sources, 1992, pp. 181–188, Vol 37, Elseiver Sequoia, Lausanne, Switzerland. No month available.

Wilkinson, Voss and Prater, Water Management and Stack Design for Solid Polymer Fuel Cells, Journal of Power Sources, 1994, pp. 117–127, Vol 49, Elsevier Sequoia, Lausanne, Switzerland. No month available.

Prater, Keith B., Solid Polymer Fuel Cells for Transport and Stationary Applications, Journal of Power Sources, 1996, pp. 105–109, vol. 61, Elseiver Science S.A., Lausanne, Switzerland. No month available.

* cited by examiner

SOLID CAGE FUEL CELL STACK

FIELD OF THE INVENTION

This invention relates generally to electrochemical fuel cell stacks and, more particularly, to proton-exchange-membrane ("PEM") fuel cell stacks.

BACKGROUND OF THE INVENTION

Electrochemical fuel cells convert fuel and an oxidant to electricity and a reaction product. In electrochemical fuel cells employing hydrogen as the fuel and oxygen as the oxidant, the reaction product is water. Solid polymer fuel cells generally include a membrane electrode assembly ("MEA") layer comprising a solid polymer electrolyte or ion exchange membrane disposed between two electrode layers. The electrode layers typically comprise porous, electrically conductive sheet material and an electrocatalyst at each membrane-electrode interface to promote the desired electrochemical reaction.

At the anode, the fuel (typically hydrogen) moves through the porous electrode material and is oxidized at the anode electrocatalyst to form cations, which migrate through the membrane to the cathode. At the cathode, the oxidizing gas (typically oxygen contained in air) moves through the porous electrode material and is reduced by reaction with the cations at the cathode electrocatalyst to form the reaction product (water).

In conventional fuel cells, the MEA layer is interposed between two substantially fluid-impermeable, electrically-conductive plates, commonly referred to as separator plates. The separator plates serve as current conductors; provide structural support for the electrode layers; typically provide means for directing the fuel and oxidant to the anode and cathode layers, respectively; and typically provide means for exhausting products, such as water, formed during operation of the fuel cell. Separator plates having reactant channels, that is, channels for the fuel or oxidizing gas, are sometimes referred to as fluid flow field plates.

Typically, the reaction product water migrates through the MEA layer to the adjoining reactant channels and is carried from the fuel cell by the fuel gas and oxidizing gas. Typical MEA layers work most effectively if they are humidified with water. Despite the production of the reaction product water and its migration through the MEA layer, providing dry fuel gas and oxidizing gas to the fuel cell tends to dehydrate portions of the MEA layer, reducing their efficiency. The portions of the MEA layer that are susceptible to dehydration are those with which the fuel gas and oxidizing gas come into contact before the fuel gas and oxidizing gas have picked up appreciable reactant water, that is, at the upstream ends of the fuel-gas and oxidizing-gas channels. To overcome the problem of dehydration of the MEA layer, the fuel gas and oxidizing gas are typically humidified, that is, water vapour is added to the fuel gas and oxidizing gas.

Fuel cell stacks are well known, comprising an aligned assembly of fuel cells connected together electrically in series to obtain desired voltage and power output. An early example of a fuel cell stack is illustrated in Maru U.S. Pat. No. 4,444,851 granted Apr. 24, 1984; a later example is illustrated in Washington U.S. Pat. No. 5,514,487 granted May 7, 1996.

The fuel cell reaction is exothermic and fuel cell stacks typically have cooling means associated with them, such as plates interposed between the fuel cells having cooling passages for circulating a coolant fluid so as to absorb and carry away heat.

Typically, in any such fuel cell stack, one side of a given fluid flow field plate (separator plate) provides means (typically fuel-gas channels) for directing the fuel to the anode layer of one cell, and the other side of the plate provides means (typically oxidizing-gas channels) for directing the oxidizing gas to the cathode layer of the adjacent cell, and so on seriatim. As well, separator plates may also have channels for a coolant fluid on one side and channels for either fuel gas or oxidizing gas on the other side. Such plates, that is, plates having channels on each side, are sometimes referred to as bipolar plates.

With current MEA technology, the greatest power density is achieved with fuel gas and oxidant gas both compressed to roughly 3 bar, roughly 44 pounds per square inch, and this is the sort of pressures at which most known PEM fuel cell stacks are designed to function.

Typically, for a fuel cell stack to operate properly the fuel cell stack assembly must, in general terms, include: means for containing the fuel cell stack; means for providing fuel gas and oxidizing gas to the reactant channels and for conducting reaction product, fuel gas and oxidizing gas from the reactant channels; and means for cooling the fuel cell stack.

The means for containing a fuel cell stack typically must both compress and align the fuel cell stack. The fuel cell stacks must be compressed so as to press the individual fuel cell components and the fuel cells together in order to prevent leaks from between the plates and to provide good electrical contact between the components. Proper alignment of the plates aids in preventing leaks from between the plates, particularly in the case of fuel cell stacks having internal manifolds. In use, the vertical dimension of the fuel cell stack tends to fluctuate due to: temperature changes (the fuel cell stack generates heat and expands during operation, and cools and contracts after use); and absorption of water and resulting expansion of the proton exchange membrane of the MEA layer. Typically the means for containing fuel cell stacks include means for compensating for this size fluctuation, such as compression springs.

Various means for containing fuel cell stacks are known. For example, many known fuel cell stack assemblies use conventional rod and plate configurations that comprise two end plates between which the fuel cells are sandwiched. The end plates are larger than the fuel cells and have holes spaced about their peripheries. Rods having threaded ends are inserted in the holes so as to run through a hole in each end plate. Nuts, threaded onto each end of the rods and tightened down, provide the compressive force. Coil springs and washers, placed between the nuts and one of the end plates, permit the end plate to move relative to the rods to compensate for expansion and contraction of the fuel cells. With typical PEM fuel cells operating with fuel gas and oxidant gas at pressures of roughly 44 pounds per square inch, the components of the containment must be very heavy and robust. Such conventional rod and plate containment means typically rely on the compression of the fuel cell stack and the resulting friction between fuel cell components to maintain the required rigidity of the fuel cell stack assembly and the required alignment of the fuel cell components.

In all previous PEM fuel cell stack designs, the means for providing fuel gas and oxidizing gas to the reactant channels and for conducting reaction product, fuel gas and oxidizing gas from the reactant channels can be generally divided into two categories: those with internal manifolds and those with external manifolds/plena. Internal manifolds have been almost universally used in preference to external plena or manifolds for proton exchange membrane (PEM) fuel cell stacks. In part this is because hydrogen, which has the smallest atomic structure of all elements and thus is difficult to contain, and which is used at relatively high pressures, can generally be more effectively contained by internal manifolds than by external plena. In internal-manifold fuel cell stacks, the hydrogen is typically provided to the stack via conventional tubing attached to internal manifold ports in the top or bottom end plate. In external-plena PEM fuel cell stacks, the joints between the plena and the fuel cell stack containment means, and the joint between the containment means and the fuel cell stack itself, must be somehow sealed so as to contain the hydrogen, which can be difficult.

In internal-manifold fuel cell stacks, each plate and MEA layer of the fuel cell stack has holes that align with corresponding holes in the other components to form internal manifolds, extending from the top end to the bottom end of the stack. Typically, a pair of internal manifolds is provided for each of the fuel gas, oxidizing gas and a cooling fluid. The relevant channels in the plates have ports opening to the relevant internal manifolds, so that, for example, in use oxidant gas enters an oxidant-gas internal manifold at the top or bottom end of the fuel cell stack and flows through the oxidant gas channels to the other oxidant-gas internal manifold so as to exit the fuel gas stack. The paths of the fuel gas and oxidant gas through the fuel cell stack are typically tortuous, which resists the flow of these gases. The fuel gas (typically hydrogen) is generally supplied from a pressure vessel containing the fuel gas at a pressure regulated to be suitable for use in the fuel cell stack. The oxidant gas, on the other hand, is typically air drawn from the surrounding atmosphere and must be compressed to the desired pressure with some form of pump or compressor. Such air pumps are heavy, costly and typically use about fifteen percent of the power produced by the fuel cell stack to compress the air.

In external-manifolds/plena fuel cell stacks, the various channels have opening ports at the edges of the respective plates and the fuel gas, oxidizing gas and cooling fluid are provided from the sides of the fuel cell stack. Washington et al., U.S. Pat. No. 5,514,487, issued May 7, 1996, discloses an example of an external (or "edge") manifold fuel cell stack.

In conventional external-plena fuel cell stacks, a plenum is typically attached to each of the four sides of the fuel cell stack. Typically, the cooling fluid is also air; and one pair of opposed plena is used to provide fuel gas to one side of the fuel cell stack and exhaust it from an opposite second side, and one pair of opposed plena is used to provide air (for use as an oxidizing gas and a cooling gas) to a third side of the fuel cell stack and exhaust it from an opposite fourth side. In some such conventional external-plena fuel cell stacks some portion of the dual-function air thus provided passes through narrow oxidant channels and a much larger portion, typically five to ten times larger, passes through wider cooling channels. In many such conventional external-plena fuel cell stacks only one set of air channels is used to both provide oxidant to the MEA layer and to cool the fuel cell stack. One problem with both of these dual-function-air configurations is that, for optimum fuel cell efficiency, all of the dual-function air must be humidified so that the small portion of the air that contacts the MEA layer, does not dehydrate the MEA layer. Although the water can be recovered from the air exhausted from such fuel cell stacks, the large volume of the dual-function air makes this inefficient and typically such fuel cell stacks contain a water reservoir to which water must be added from time to time to replace the water carried away by the exhausted dual-function air.

Another problem with fuel cell stacks using combined cooling and oxidant air relates to the need to filter the air. Typically, the oxidant air must be substantially free of dust and other particulate matter that might contaminate the MEA layer or block the oxidant channel, whereas, with separate oxidant channels and cooling air channels, the cooling air, which passes through the larger cooling air channels, can contain some particulate matter without fear of contaminating the MEA layer or that the cooling air channels will become blocked. However, with such fuel cell stacks using dual-function air, the combined cooling and oxidant air is typically passed through a filter or series of filters to remove the particulate matter to the standard required for the oxidant air, which involves much higher volume filters than would otherwise be required.

Another problem with fuel cell stacks using combined cooling and oxidant air relates to the balancing of the different flow rate requirements for the cooling air and the oxidant air. The oxidant air flow rate and humidification should be such as to provide an adequate supply of oxygen to the MEA layer while preventing dehydration due to too high a flow rate, and on the other hand preventing flooding, and consequent blockage of the oxidant air channels, due to too low a flow rate. The flow rate in the cooling air channels must be much larger than that in the oxidant air channels so as to carry sufficient heat from the fuel cell stack. The flow rates of the cooling air and the oxidant air are typically balanced by the sizing of the respective channels, which solution typically requires an air supply device capable of providing a relatively large volume of air at a relatively high pressure.

External plena are not easily adapted for use with conventional means for containing fuel cell stacks where the top and bottom end plates move relative to each other due to the fluctuations in the vertical dimension of the fuel cell stack. One solution to this problem is disclosed in Dong. (WO 99/57781), publication date Nov. 11, 1999, wherein the fuel cell stack assembly includes top and bottom end plates fixed relative to each other, and the fuel cell stack includes a distributed spring array, consisting of corrugated plates interposed between the fuel cells, that exert a compressive force and compensate for expansion and contraction of the fuel cell stack. The corrugated plates also act as channels for the coolant fluid (air) which flows from one side of the fuel cell stack to the opposite side. The sides of the fuel cell stack not involved in providing or exhausting coolant fluid are vertically divided by a separator bar so that fuel gas and oxidizing gas can be separately provided and exhausted from these sides of the fuel cell stack by means of divided external plena. This design provides a rigid frame to which the plena may be attached, but does not of itself overcome the other difficulties associated with providing hydrogen to a fuel cell stack via external plena.

Fuel cell design for conventional PEM fuel cells and stacks has been largely influenced by the objective of using such fuel cell stacks for automotive transportation. Comparatively little attention has been paid to the design of smaller portable fuel cells for low-power use, such as for powering scooters, bicycles, camping equipment, etc., where light weight, small size, convenience of portability, durability in the face of rough service and a generally minimalist design approach consistent with low manufacturing cost are objectives.

SUMMARY OF THE INVENTION

Although a fuel cell stack can be oriented in any direction including on its side, for clarity in this specification and in the claims, the fuel cell stack is described as if it has a top and a bottom, and the description accordingly includes a discussion of horizontal and vertical orientation. The reader will recognize that these terms are relative, and that once the interrelationship of the component elements is understood, the orientation of the fuel cell stack within a given vehicle, engine, device, etc. is the designer's choice, and that in use, the orientation may vary.

In one aspect, the invention comprises a structurally-stable adequately strong cage for containing a stack of fuel cells between a bottom end plate and a top pressure plate. Each fuel cell within the stack is generally horizontally disposed, so the stack of fuel cells itself is generally vertically disposed and constrained between the top pressure plate and bottom end plate. The cage preferably comprises four struts arranged at the corners of the fuel cell stack, which typically is arranged within the cage in a generally rectangular parallelepiped configuration. Although the four-strut rectangular parallelepiped configuration is considered to be preferred for a number of reasons to be elaborated below, alternative cages could be designed with a different configuration and a different number of struts. For example the fuel cell stack could be cylindrical and the bottom end plate and top pressure plate could be circular. Such cylindrical cage could have struts on the outside, a central strut, or both.

In a rectangular parallelepiped configuration, each strut is fixed at its upper end to a corner of a top end plate and at its lower end to a corresponding corner of a bottom end plate. Underneath the top plate is the top pressure plate. A separate bottom pressure plate may be included immediately above the bottom end plate, but more typically the bottom end plate also serves as a bottom pressure plate.

The top pressure plate is spaced downwardly from the top end plate. An array of horizontally-spaced jack screws or other suitable means for effecting a displacement of the top pressure plate in a generally vertical direction relative to the cage frame, for example an expansion structure such as an inflating cushion or expansion pad (such as a heat sensitive expansion pad), disposed between the top end plate and the top pressure plate, is provided so as to apply a compressive force to the fuel cell stack between the top pressure plate and the bottom end plate. Preferably, springs, or other suitable means for permitting the top pressure plate to move vertically to accommodate thermal and hydro expansion and contraction of the fuel cell stack, are interposed between the jack screws and the top pressure plate. When the cage is assembled, the jack screws, whose longitudinal axis is preferably generally vertical, are screwed downwardly to force the top pressure plate downwards relative to the top end plate and against the resistance of any springs interposed between the jack screws and the pressure plate, thereby placing the pressure plate, and consequently the fuel cell stack thereunder, under compressive force, the magnitude of which force can be varied by varying the extent of downward displacement of the pressure plate.

The fuel cell stack is thus constrained in the vertical dimension between the top and the bottom pressure plates, and in the horizontal dimension between the struts. To meet this latter objective, the struts are preferably L-shaped in cross-section so that the corners of the generally rectangular horizontally disposed fuel cells in the stack are engaged by the struts. Other configurations of the struts and fuel cells could be devised for suitable mating and constraining engagement, but the engagement of the corners of rectangular fuel cells by L-shaped struts is simple and inexpensive. Preferably, strut liners are interposed between the L-shaped struts and the fuel cell stack corners so as to isolate the fuel cell stack from shock and vibration experienced by the cage; to electrically isolate the fuel cell stack from the L-shaped struts; and to impede the passage of fluids between the fuel cell stack and the L-shaped struts. Such strut liners may not be needed if the struts themselves are made from an electrical-insulating, shock-resistant material that will act to impede the passage of fluids between the fuel cell stack and the struts.

To facilitate the attachment of the end plates to the struts, the struts are preferably provided at their ends with strut braces or are otherwise formed with relatively massive ends that are bored and threaded to form a threaded socket for receiving a mating attachment bolt. The end plates in this preferred embodiment of the invention are provided with holes at their corners through which the bolts may pass, so that the bolts may secure the end plates to the struts. Depending upon the shaping of the end portions of the struts, the pressure plates may be provided with mating indentations that engage these strut end portions, thereby constraining the pressure plates against horizontal displacement relative to the stack. Alternatively, the struts may be provided at their ends with feet having holes and the end plates may have threaded receptacles at their corners for receiving a mated foot bolt, such that an end plate can be disposed between the feet and the fuel cell stack, so that the foot bolts may secure the feet to the end plate.

A cage design of the foregoing sort is capable of providing reliable structural integrity and substantial rigidity to the fuel cell stack assembly. This cage design also separates the function of maintenance of alignment of the fuel cell components from the function of compression of the fuel cell stack, permitting reliable alignment and compression control, especially as compared to conventional fuel cell stack containment means of the rod-and-plate type mentioned above. In the preferred embodiment of the present invention, as the cage is rigid and the L-shaped struts maintain the alignment of the fuel cell components, the compressive force to be exerted on the fuel cell stack can be determined solely on the basis of the need to maintain proper electrical contact and prevent leaks from between the fuel cell stack components.

The foregoing cage design also lends itself to convenient provision and exhaust of fuel gas, oxidant gas and cooling fluid. The compression and alignment control provided by the cage design facilitates the use of internal manifolds, while the rigid frame facilitates the attachment and sealing of external plena. Thus, the foregoing cage design enables the provision of fuel gas to the fuel cells via internal manifolds, which is desirable, particularly with hydrogen which is difficult to contain otherwise; and permits cooling fluid and oxidant gas to be provided to the sides of the fuel cell stack, which is desirable, particularly with fuel cell stacks using air for both the cooling fluid and oxidant gas, as the air is typically at a relatively lower pressure and can be adequately contained in simple and inexpensive plena and ducting.

Further, the provision of fuel gas by internal manifolds, and the provision of cooling air and oxidant air by external plena; and the four-sided shape of the fuel cell stack, facilitate the separation of the cooling air and oxidant air streams. The cooling air can enter the fuel cell stack at a first side and exit at a second side, and the oxidant air can enter at a third side and exit at a fourth side. As compared to fuel cell stacks using dual function cooling/oxidant air, the separation of the cooling air and oxidant air streams: (i) reduces the volume of air to be humidified, and thus simplifies the dehydration of the exhausted oxidant air, so as to make it easier to make the fuel cell stack self sustaining with respect to water; (ii) reduces the volume of air to be filtered to the standard required for the oxidant air, to as little as a tenth of that in fuel cell stacks using dual-function air, permitting smaller, less-expensive filters, or less frequent filter cleaning or changing; and (iii) removes the need to size the cooling air channels and oxidant air channels so as to balance the flow rates as between them.

Preferably, the first and second sides of the fuel cell stack are opposite each other and the third and fourth sides of the fuel cell stack are opposite each other such that the general direction of flow of the oxidant gas is substantially perpendicular to the general direction of flow of the cooling fluid. This cross-flow configuration permits the flow resistance of the cooling air channels and oxidant air channels to be adjusted by altering the horizontal dimensions of the fuel cell stack and thus the length of the respective channels. Typically, it is preferable for the oxidant-air channels to be longer than the cooling air channels. This can be easily achieved by making the fuel cells and associated cooling plates rectangular, with one pair of edges longer than the other pair of edges, with the cooling air channels open to the wider sides of the fuel cell stack and the oxidant air channel open to the narrower sides of the fuel cell stack. The oxidant air channels and cooling air channels can be configured so as to provide less resistance to flow than many known flow fields which have tortuous paths due to the constraints of the relevant fuel cell stack configurations. Linear channels, that is, channels that are straight from one side of the fuel cell stack to the other, provide minimal flow resistance as they tend to promote laminar flow in the oxidant and cooling air. However, some turbulence is desirable to promote mixing, so as to avoid regions of low oxygen in the oxidant air and so as to facilitate heat transfer in the cooling air. Therefore the preferred oxidant air channels and cooling air channels are not straight, but rather typically have means for inducing some turbulence, such as bends in the channels. As the channels could be straight, they need only have sufficient bends, or other turbulence causing features, to cause the desired mixing. This means the channels can be designed for minimal flow resistance, which allows low-cost blowers and fans to be used to provide air to such fuel cells stacks.

For larger stacks, liquid cooling could conceivably be substituted for air cooling, although the present invention is intended to be inexpensively implemented, and air cooling is simpler and less expensive to provide. The cooling fluid passes through the channels from side to side of each cooling plate so as to conduct heat from the fuel stack. The cooling plates may be arranged so that between successive fuel cells in the stack, a cooling plate is interposed. Or fewer cooling plates could be used for very small, very low-power fuel cell stacks. Or each fuel cell could be designed to provide therein cooling passages, eliminating the need for separate cooling plates altogether. It is also possible to have only a single plate between each MEA layer, being a bipolar plate having fuel gas channels on one side; oxidant gas channels on the other side; and cooling fluid channels within the plate.

Other advantages and structural options and alternatives will become apparent from a reading of the following detailed description.

DETAILED DESCRIPTION OF PREFERRED EMBODIMENT

Figure 1:
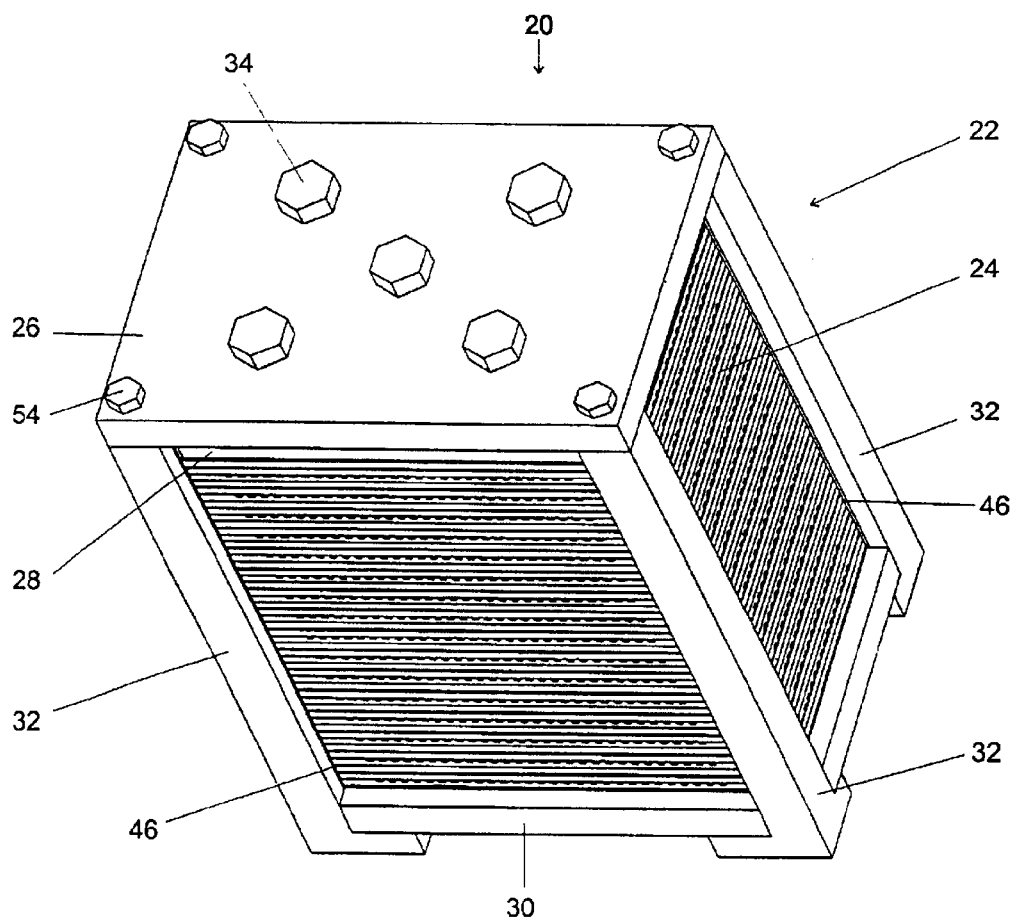
FIG. 1 is an isometric view showing an embodiment of the solid cage fuel cell stack of the present invention.
Figure 2:
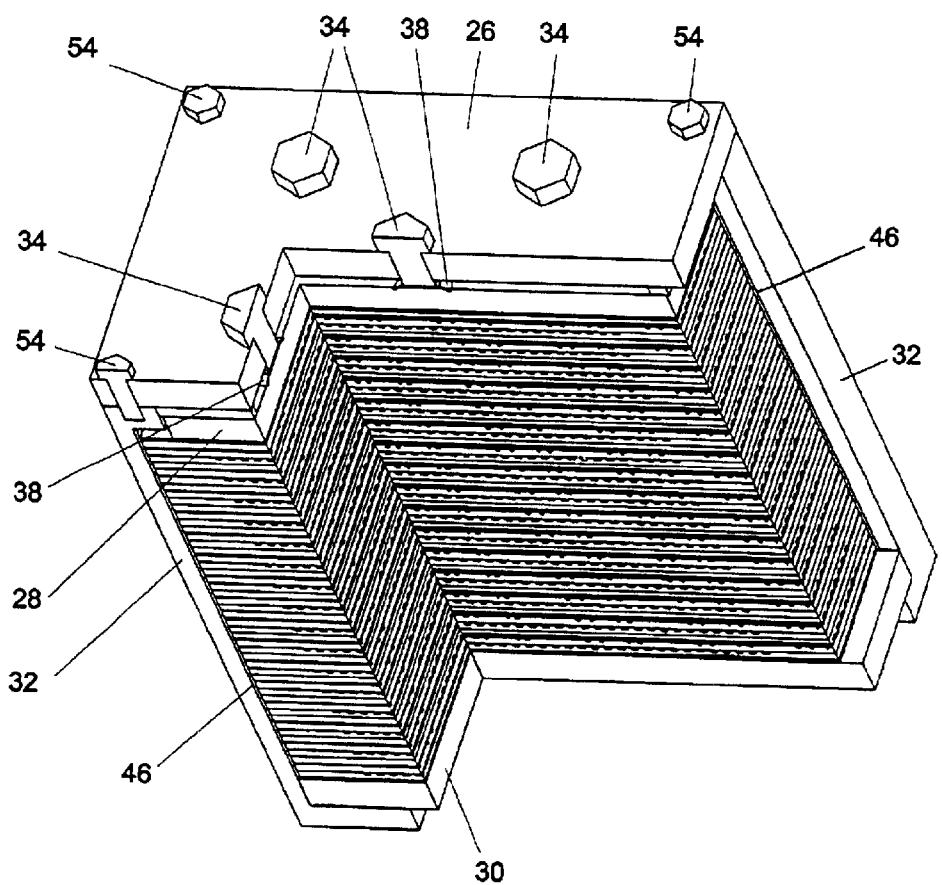
FIG. 2 is a cutaway isometric view showing an embodiment of the solid cage fuel cell stack of the present invention.
Figure 3:
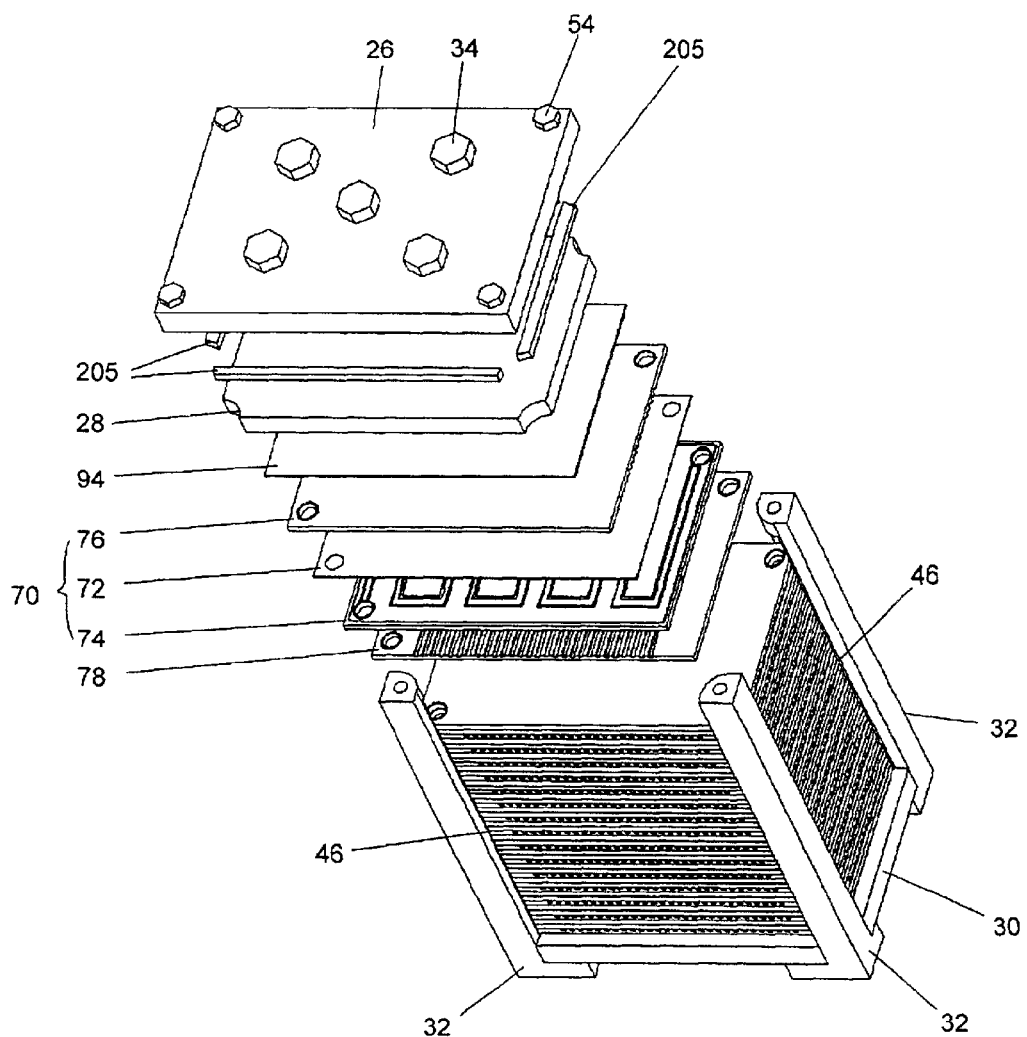
FIG. 3 is an exploded isometric view showing an embodiment of the solid cage fuel cell stack of the present invention.
Figure 4:
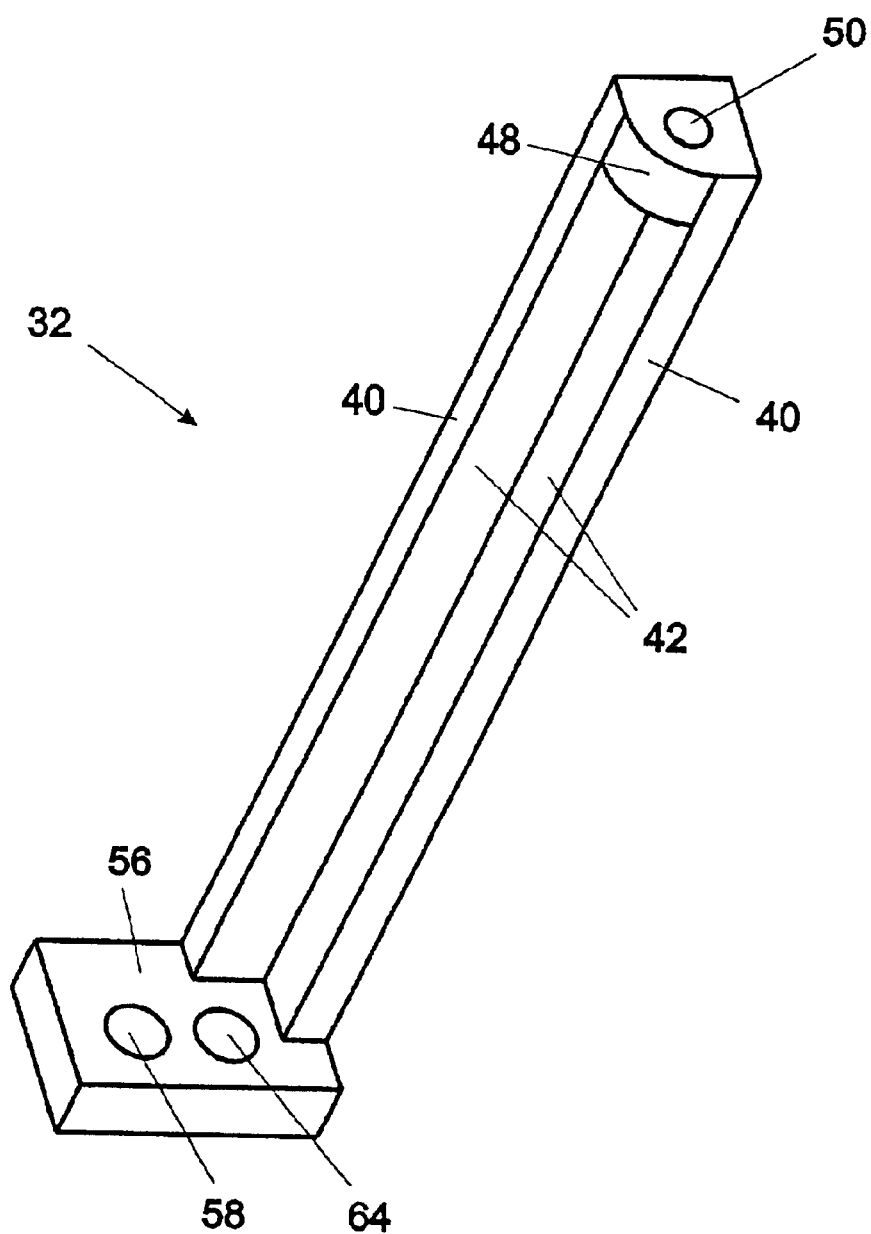
FIG. 4 is an isometric view showing an embodiment of the strut of the solid cage fuel cell stack having a foot fuel opening.
Figure 5:
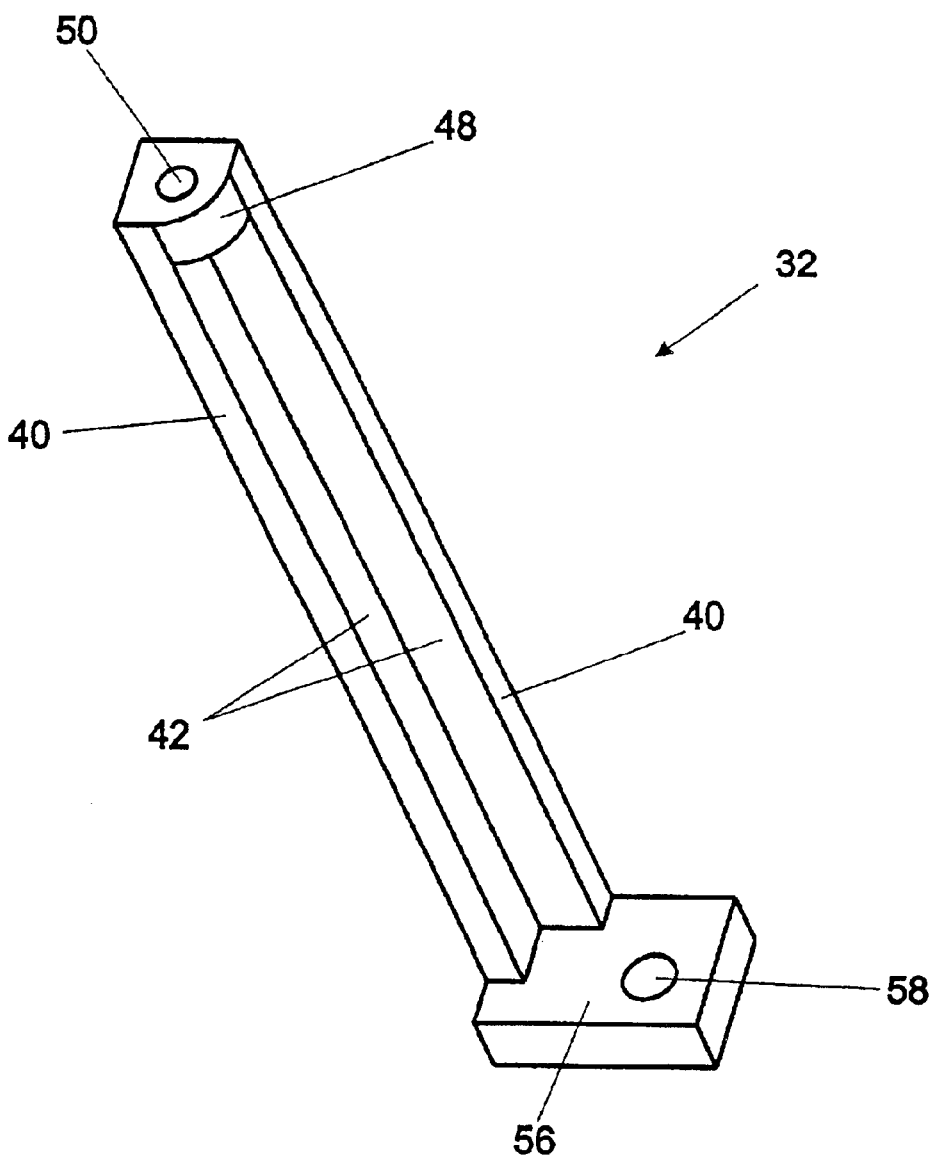
FIG. 5 is an isometric view showing an embodiment of the strut of the solid cage fuel cell stack not having a foot fuel opening.

Referring to the drawings, a preferred embodiment of the solid cage fuel cell stack 20 is shown in perspective view in FIG. 1, in cut-away perspective view in FIG. 2 and in exploded view in FIG. 3. The solid cage fuel cell stack 20 comprises a rigid rectangular parallelepiped cage 22 containing a rectangular parallelepiped fuel cell stack 24.

In the embodiment shown in the drawings, the cage 22 comprises a top end plate 26, a pressure plate 28, a bottom end plate 30 and four struts 32. As shown in FIGS. 1 and 2, each of the struts 32 is attached to a corner of the top end plate 26 and a corner of the bottom end plate 30 so as to fix the top and bottom end plates 26,30 in a spaced parallel relationship. Other cage embodiments are possible, including two-strut configurations (not shown) wherein each strut has two end brackets, each bracket for attaching to an associated end plates, the brackets being connected one to the other by two longitudinal members, the members being separated from each other by the width of the fuel cell stack such that the members are proximate to the corners of the fuel cell when the brackets are attached to the end plates. Further, the struts may be integral to plena (not shown) attached to the top end plate 26 and bottom end plate 30.

The fuel cell stack 24 is positioned between the bottom end plate 30 and the pressure plate 28. The fuel cell stack 24 can be compressed between the bottom end plate 30 and the pressure plate by means of the jack screws 34. The jack screws 34 are screwed into threaded jack-screw holes 36 in the top end plate 26. The jack screws 34 project into the space between the top end plate 26 and the pressure plate 28. Typically, a spring is positioned between each jack screw 34 and the pressure plate 28, to compensate for vertical expansion and contraction of the fuel cell stack 24. In the embodiment shown in FIG. 2, dish springs 38 are shown, but other springs such as coil springs can be used. The fuel cell stack 24 can be compressed between the pressure plate 28 and the bottom end plate 30 by screwing the jack screws 34 into the jack-screw holes 36.

Each strut 32, is L-shaped, having two longitudinally-extending strut flanges 40 presenting inward-facing strut faces 42 that are substantially normal to each other. Where they meet, the strut faces 42 form longitudinally-extending, right-angle corners. The strut faces 42 are lined with non-conductive strut liners 46 (FIG. 2). The strut liners 46 may be rubber, plastic or any other suitable material. The vertical edge corners of the fuel cell stack 24 fit within the strut corners 38 and typically abut the strut liners 40. The strut liners 46 act to: electrically insulate the fuel cell stack 24 from the cage 22; protect the fuel cell stack 24 from physical shock; and seal the space between the strut faces 42 and the fuel cell stack 24 so as to prevent the passage of air therebetween. It will be clear that the cage 22 must be made to tolerances sufficient to properly contain the fuel cell stack 24 components.

Figure 6:
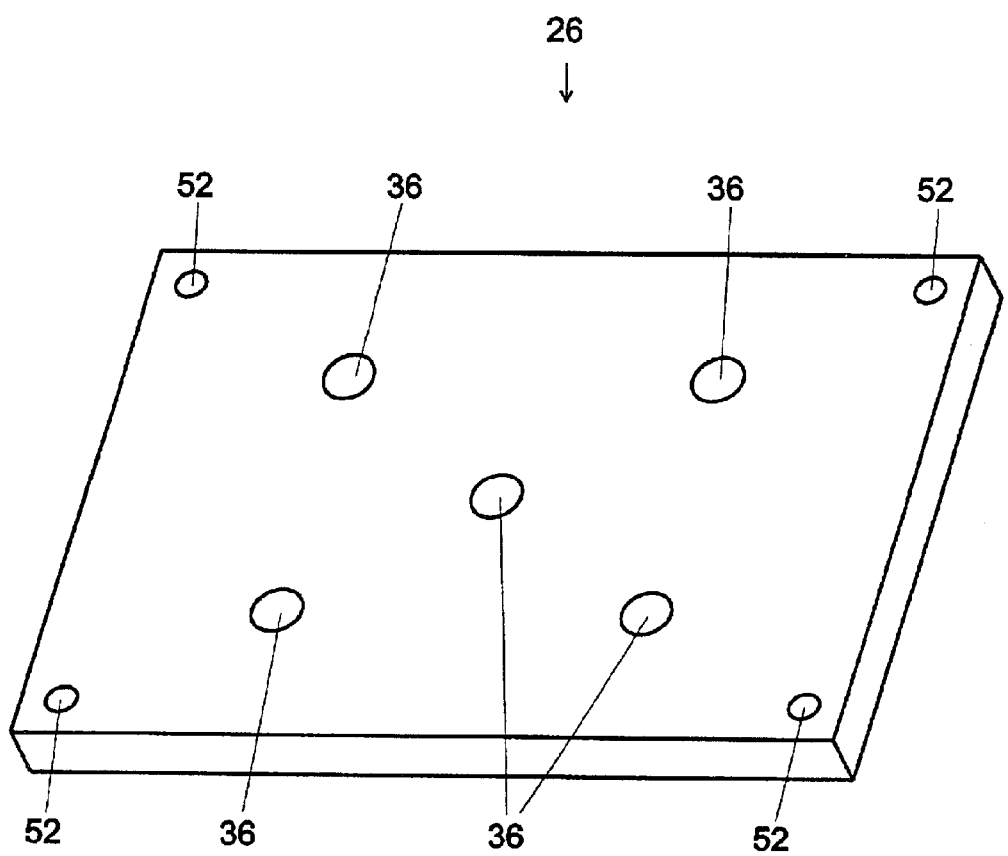
FIG. 6 is an isometric view showing an embodiment of the top end plate of the solid cage fuel cell stack.
Figure 7:
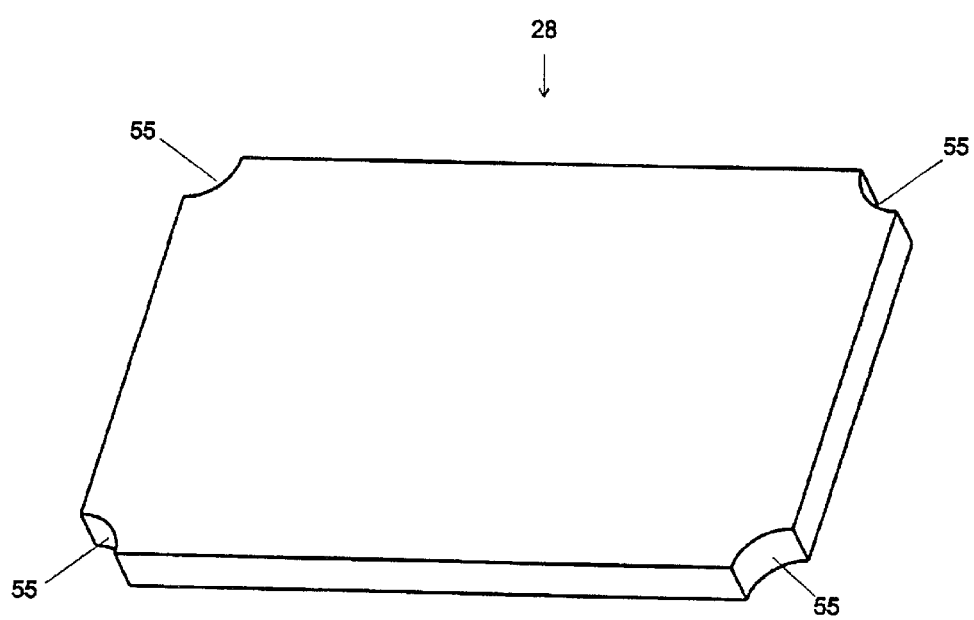
FIG. 7 is an isometric view showing an embodiment of the pressure plate of the solid cage fuel cell stack.

The top end of each strut 32 includes means for attaching the strut 32 to the top end plate 26. In the embodiment shown in the drawings, the means for attaching the struts 32 to the top end plate 26 comprises: a strut brace 48 at the top end of each strut 32, being relatively massive ends having a longitudinally-extending threaded strut socket 50; a brace bolt hole 52 proximate to each corner of the top end plate 26 (FIG. 6); and four brace bolts 54. The brace bolts 54 are inserted through the brace bolt holes 52 and screwed into the strut sockets 50, to attach the struts 32 to the top end plates 26. As shown in FIG. 7, the corners of the pressure plate 28 have rounded notches 55 so as to fit between the strut braces 48.

Figure 8:
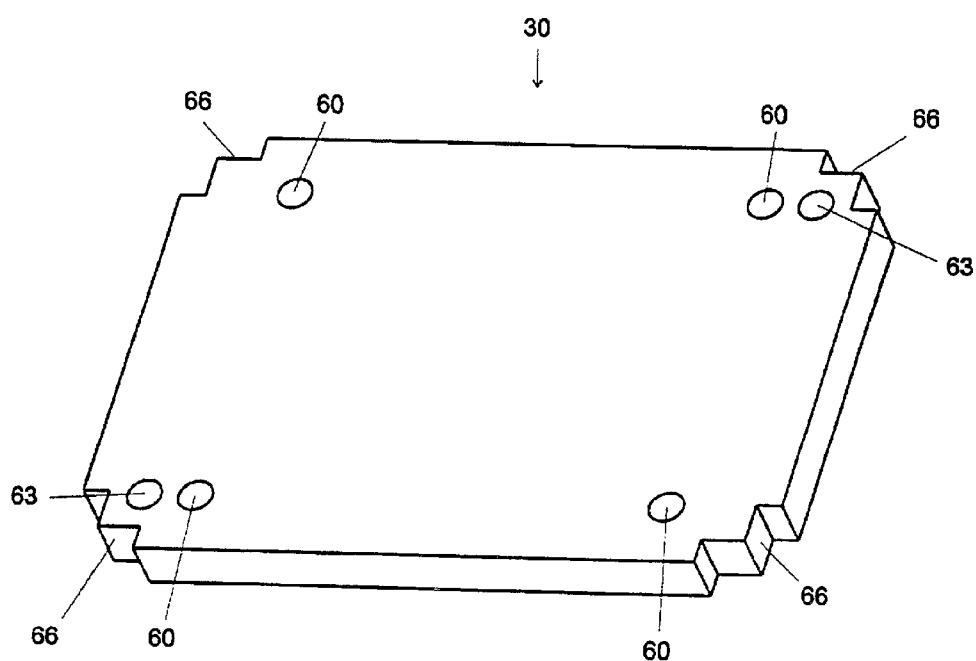
FIG. 8 is an isometric view showing an embodiment of the bottom end plate of the solid cage fuel cell stack, which also serves as a bottom pressure plate.

The bottom end of each strut 32 includes means for attaching the strut 32 to the bottom end plate 30. In the embodiment shown in the drawings, the means for attaching the struts 32 to the bottom end plate 30 comprises: a strut foot 56 extending perpendicularly from the bottom end of each strut 32 and having a foot bolt hole 58; a threaded foot bolt socket 60 proximate to each corner of the bottom end plate 30; and a foot bolt 62. To attach a strut 32 to the bottom end plate 30, the strut foot 56 is positioned on the underside of the bottom end plate 30, and a foot bolt 62 is inserted through the foot bolt hole 58 and screwed into the foot bolt socket 60. As shown in FIG. 8, the bottom end plate 30 has stepped notches 66 sized and shaped to accommodate the struts 32

Figure 15:
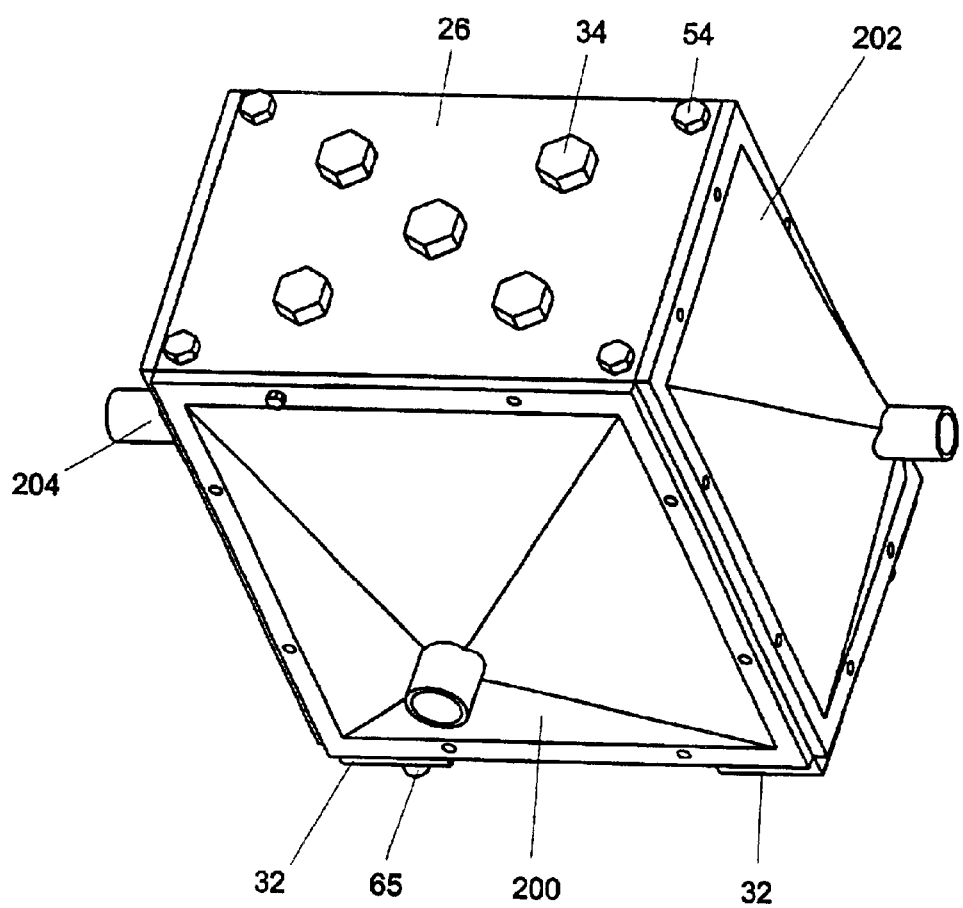
FIG. 15 is an isometric view of an embodiment of the solid cage fuel cell stack, having plena attached.
Figure 16:
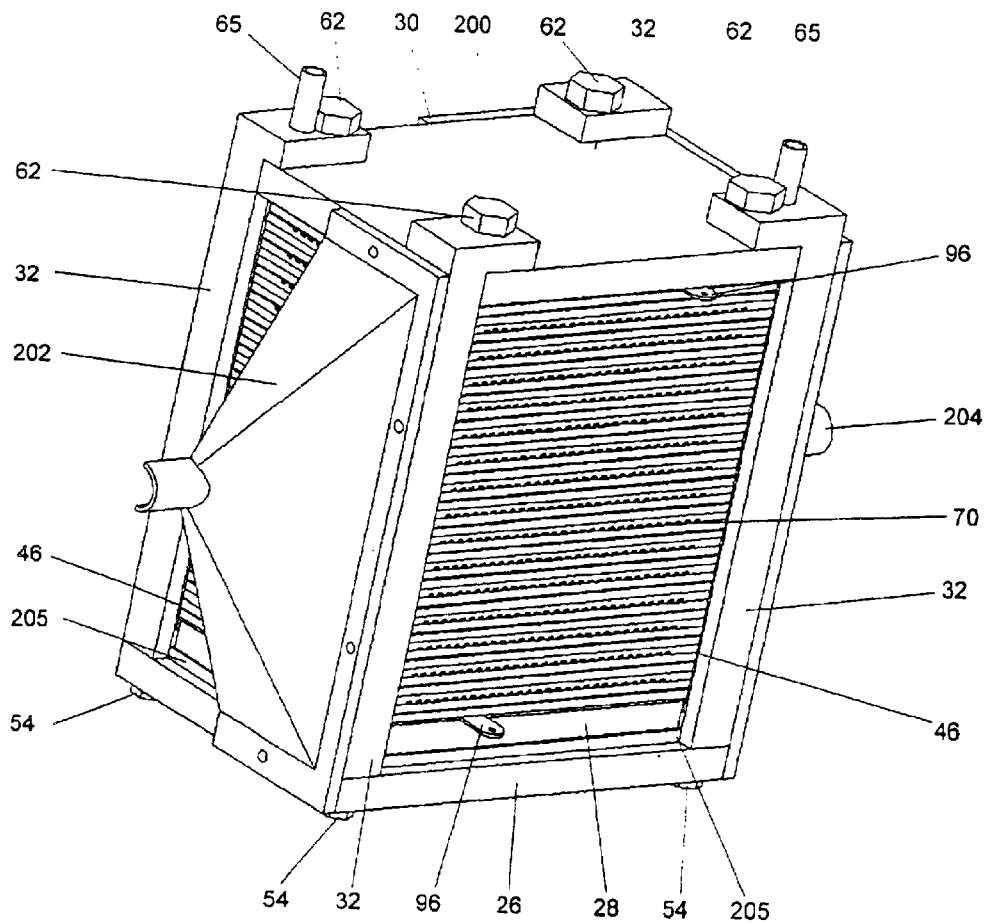
FIG. 16 is an isometric partial-cutaway view of an embodiment of the solid cage fuel cell stack, having plena attached.

Two of the struts 32 have foot fuel openings 64 through which fuel flows to and from the fuel cell stack 24 during operation of the solid cage fuel cell stack 20. In the embodiment shown in the drawings, the struts 32 having the foot fuel openings 64 are positioned diagonally opposite each other, but it will be clear that the struts 32 having the foot fuel openings 64 could be positioned at adjoining corners of the cage 22, as required to align with the internal manifolds. As shown in FIG. 8, the bottom end plate 30 has apertures 63 that align with the foot fuel openings 64 and the internal manifold. As shown in FIGS. 15, 16 and 17, fuel feed tubes 65 can be connected to the foot fuel openings 64.

The fuel cell stack 24 shown in the drawings comprises a plurality of fuel cells 70. Each fuel cell 70 is composed of an MEA layer between a fuel-gas plate 74 and an oxidant-air plate 76. Cooling-air plates 78 are interposed between the fuel cells 70. Although individual fuel-gas, oxidant-air and cooling-air plates are shown, it will be clear that other plate configurations, such as bipolar could be used. In the embodiment shown in the drawings, the MEA layers 72, fuel-gas plates 74, oxidant-air plates 76 and cooling-air plates 78 all have similar horizontal dimensions, being rectangular with side edges longer than their end edges, and correspondingly, lengths greater than their widths.

Fuel gas is fed to, and exhausted from, the fuel-gas plates 74 by means of two vertically-extending internal manifolds, formed by aligned internal-manifold holes 80 in each of the: MEA layers 72, fuel-gas plates 74, oxidant-air plates 76, cooling-air plates 78 and bottom end plate 30.

Figure 9:
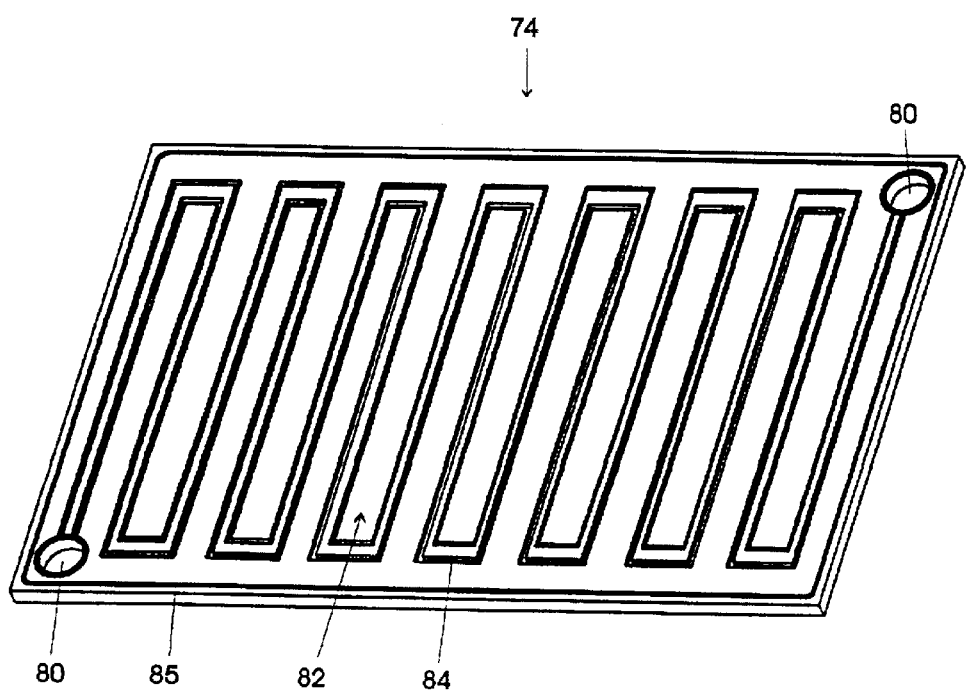
FIG. 9 is an isometric view showing the fuel gas channels of an embodiment of a fuel-gas plate.
Figure 10:
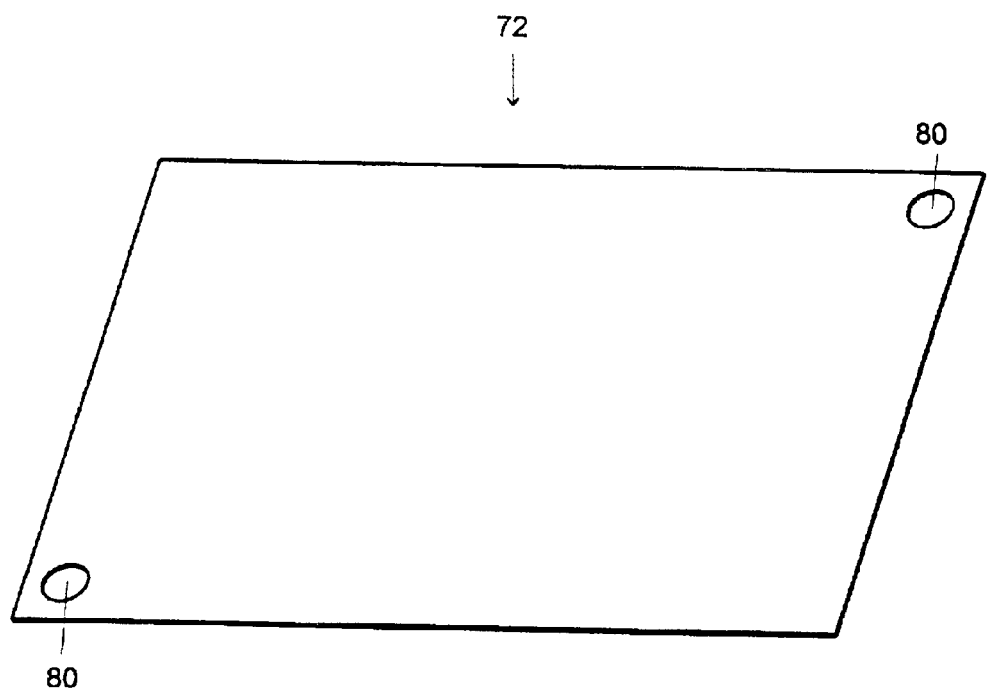
FIG. 10 is an isometric view showing an embodiment of a MEA layer having two MEA layer internal-manifold holes.

As shown in FIG. 9, in each fuel-gas plate 74, the fuel-gas flow field 82 is in fluid communication with the internal-manifold holes 80 in the fuel-gas plate 74. The fuel-gas channels 84 (shown in a simple and stylized configuration in FIG. 9), comprising the fuel-gas flow field 82, are open to the abutting MEA layer 72. Fuel gas introduced into the solid cage fuel cell stack 20 via one internal manifold, passes through the fuel-gas channels 84 to the other internal manifold and thence out of the solid cage fuel cell stack 20. The fuel gas is contained in the internal manifold by means of gaskets or O-rings (not shown) around the relevant internal-manifold holes 80, and the fuel gas is contained between the fuel-gas plate 74 and the MEA layer 72 by means of a fuel flow field gasket 85 encircling each fuel-gas flow field 82.

Figure 11:
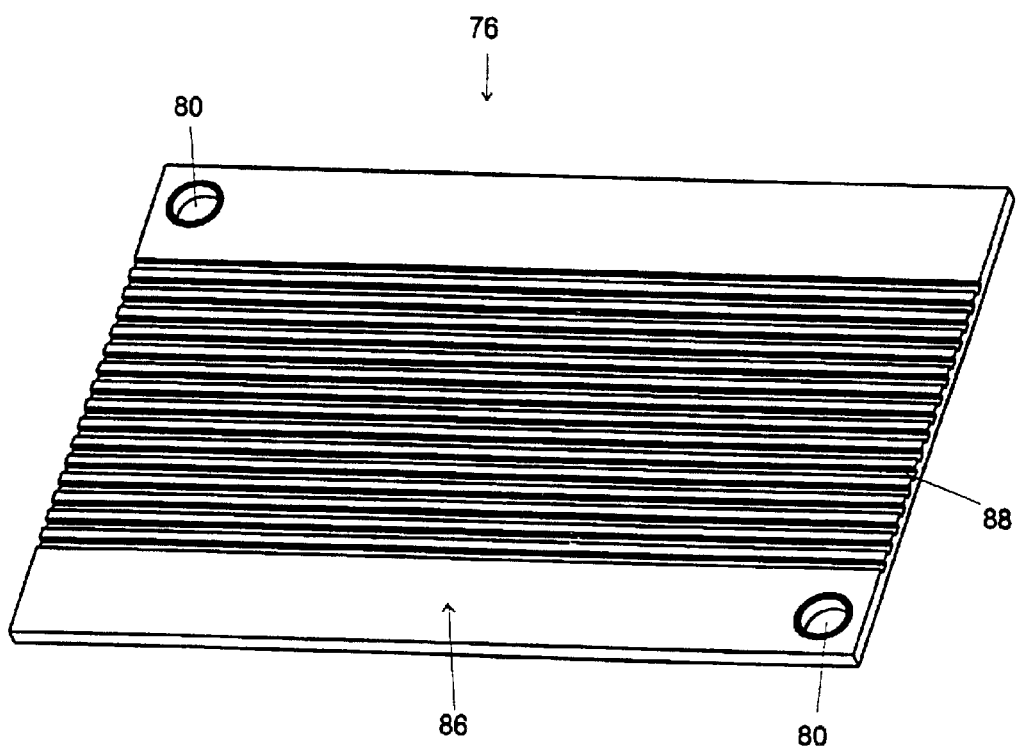
FIG. 11 is an isometric view showing the oxidant-air channels of an embodiment of an oxidant-air plate.
Figure 12:
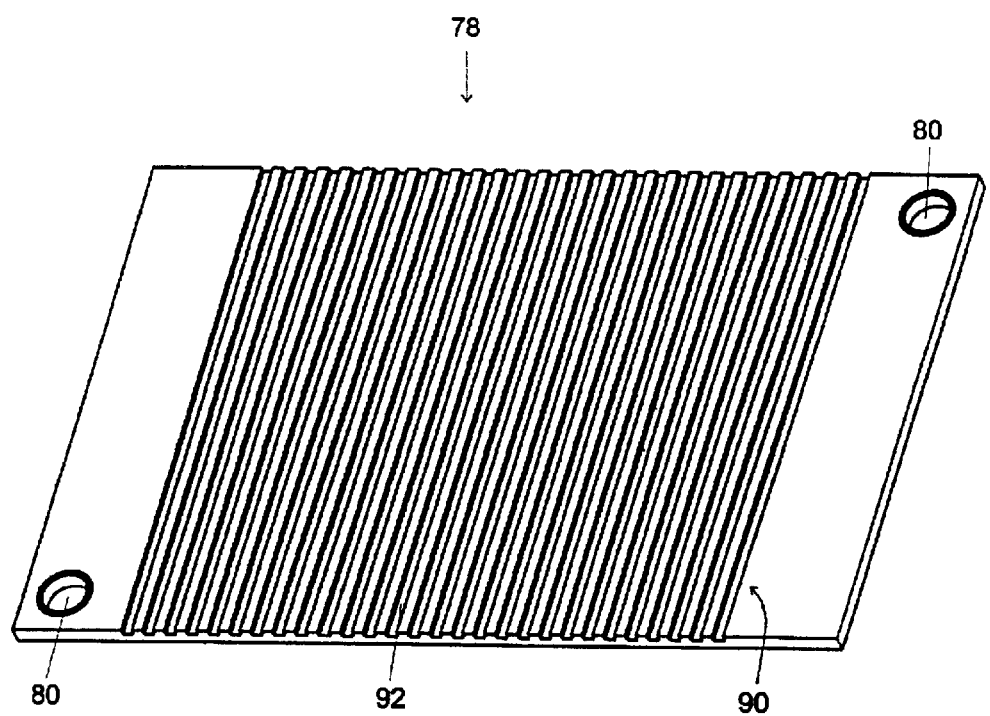
FIG. 12 is an isometric view showing the cooling-air channels of an embodiment of a cooling-air plate.

Each oxidant-air plate 76 has an oxidant-air flow field 86 on the surface of the oxidant-air plate 76 that abuts the MEA layer 72. Each oxidant-air flow field 86 comprises a plurality of oxidant-air channels 88 open to the MEA layer 72. Each oxidant-air channel 88 has an opening at each end of the respective oxidant-air plate 76 and each oxidant-air channel 88 extends the length of the oxidant-air plate 76. In the embodiment shown in the drawings, particularly FIG. 11 which is a view of the underside of an oxidant-air plate 76, the oxidant-air channels 88 are shown as linear, in that they are straight channels extending the length of the oxidant-air plates 76. It will be clear that the oxidant-air channels 88 need not be linear and that numerous other configurations of the oxidant-air channels 88 are possible, including configurations that provide increased turbulence in the oxidant air as compared to linear channels. Oxidant air provided to an end of the oxidant-air plates 76, flows through the oxidant-air channels 88, the length of the oxidant-air plate 76, to the other end of the oxidant-air plates 76.

Each cooling-air plate 78 has a cooling-air flow field 90 comprising a plurality of cooling-air channels 92. Each cooling-air channel 92 has an opening at each side of the respective cooling-air plate 78 and extends the width of the cooling-air plate 78. The cooling-air channels 92 can be open to either an adjoining fuel-gas plate 74 or an adjoining oxidant-air plate 76, or both, in the case of a bipolar cooling-air plate (not shown). In the embodiment shown in the drawings, the cooling-air channels 92 are linear, in that they are straight channels extending the width of the cooling air plates 78. It will be clear that the cooling-air channels 92 need not be linear and that numerous other configurations of the cooling-air channels 92 are possible including configurations that provide increased turbulence in the cooling air as compared to linear channels. Cooling air provided to one side of the cooling-air plates 78 flows through the cooling-air channels 92, across the width of the cooling-air plates 78, to the other side of the cooling-air plates 76.

Figure 13:
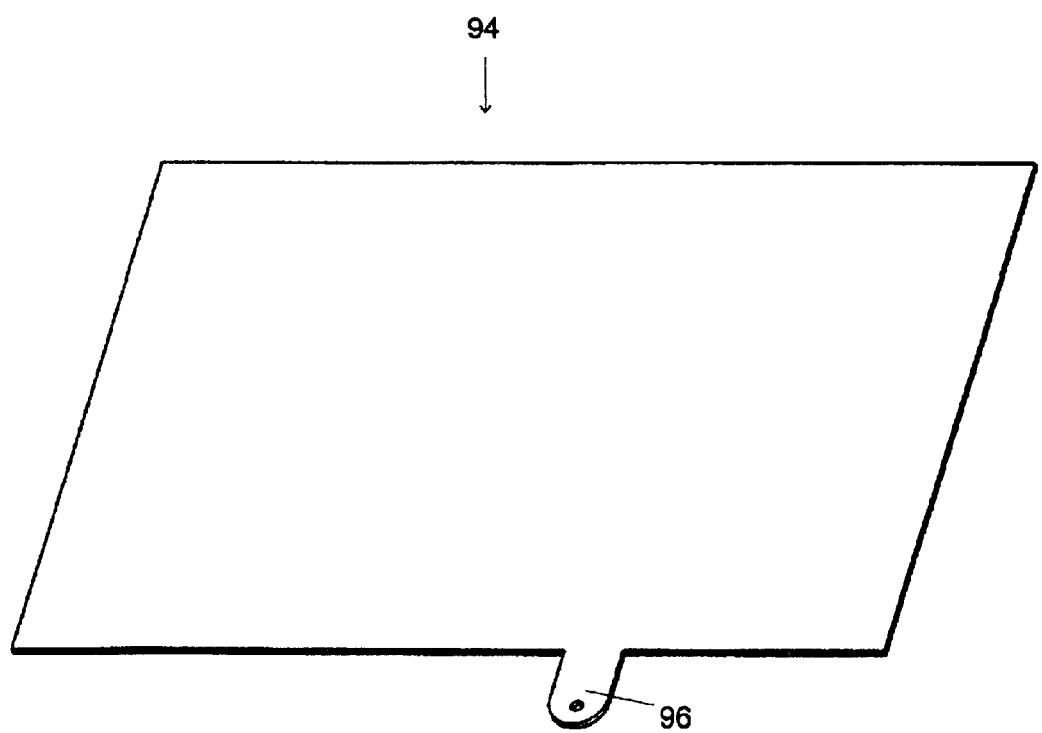
FIG. 13 is an isometric view of an embodiment of a current collector plate having a side-projecting terminal.
Figure 14:
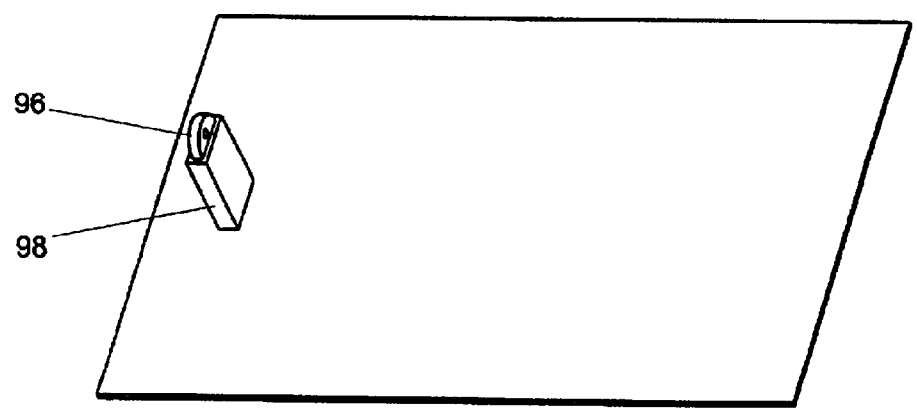
FIG. 14 is an isometric view of an embodiment of a current collector plate having a perpendicularly-projecting terminal.

Current collector plates 94, typically made from copper, are located at the top and bottom of the fuel cell stack 24. In the embodiment shown in FIG. 13, each current collector plate 94 has an electrical terminal 96 projecting from the side edge of the current collector plate 94 for connecting the fuel cell stack 24 to the device requiring electricity. Alternatively, as shown in FIG. 14, the terminal 96 can project perpendicularly from the current collector plate 94, in which case, the top end plate 26, pressure plate 28, and bottom end plate 30 would each have a terminal opening (not shown) through which the terminal 96 projects; and the terminal 96 would be electrically insulated from the cage 22 components by a terminal sheath 98, or an insulating grommet (not shown) or the like.

In the embodiment shown in the drawings, the pressure plate 28 and the bottom end plate 30 abut the current collector plates 94. The pressure plate 28 and the bottom end plate 30 are made from an electrically non-conductive material, such as a fibreglass reinforced ceramic, so as to electrically isolate the fuel cell stack 24 and current collector plates 94 from the cage 22. Alternatively, plates of electrically non-conductive material can be interposed between the current collector plates 94, and the pressure plate 28 and bottom end plates 30, respectively.

In a typical application of the solid cage fuel cell stack 20, a cooling-air inlet plenum 200, an oxidant-air inlet plenum 202 and an oxidant-air outlet plenum 204 are attached to the cage 22 as shown in FIG. 15 and cut-away in FIG. 16. Changes in the vertical dimension of the fuel cell stack 24 are compensated for by the dish springs 38, in that the position of the top end plate 26, struts 32 and bottom end plate 30 are fixed relative to each other, which means that the plena 200, 202, 204 can be easily attached to each of these components of the cage 22 by conventional means such as bolts or other fasteners, and the joint between each plenum 200, 202 204 and the cage 22 components can be easily sealed so as to be sufficiently air-tight, by conventional means such as gaskets or caulking (not shown). As shown in FIGS. 2 and 3, elastic air dams 205 are installed between the top end plate 26 and the pressure plate 28. Typically, the air dams 205 are made of rubber and are glued to the top end plate 26 and the pressure plate 28. The air dams 205 and the strut liners 46 act to isolate the oxidant air from the cooling air: by preventing air from flowing between the top end plate 26 and the pressure plate 28 in the case of the air dams 205, and by preventing air from flowing between the struts 32 and the fuel cell stack 24 in the case of the strut liners 46.

The cooling-air inlet plenum 200 is attached to one of the two larger opposed side faces of the solid cage fuel cell stack 20 so as to provide cooling air to the cooling-air channels 92 when in use. The cooling air is exhausted from the cooling-air channels 92 directly to atmosphere at the side face opposite the side face to which the cooling-air inlet plenum is attached. As shown in FIG. 16, exhausting the cooling air to atmosphere without intermediate ducting or plenum, facilitates the use of terminals 96 projecting from the side edge of the current collector plate 94 as such terminals 96 are easily accessible. Side-projecting terminals 96 are preferable over perpendicularly-projecting terminals 96 in that side-projecting terminals 96 do not require openings in the top end plate 26, pressure plate 28 or bottom end plate 30.

The oxidant-air inlet plenum 202 and the oxidant air outlet plenum 204 are attached to the smaller opposed end faces of the solid cage fuel cell stack 20. When in use, the oxidant-air inlet plenum 202 provides oxidant air to the oxidant-air channels 88, and the oxidant-air outlet plenum 204 conducts oxidant air and reaction product (water) away from the oxidant-air channels 88.

Numerous other embodiments of the invention are also possible, including, a cylindrical fuel cell stack (not shown) contained within a solid cage comprising a circular top end plate, circular pressure plate and circular bottom end plate. The struts of such a cage could have curved inner surfaces conforming to the curve of the fuel cell stack, and/or be sufficiently numerous, so as to firmly resist horizontal displacement of the fuel cell stack components. Such cylindrical fuel cell stack configuration could have a central oxidant and cooling air internal manifold, with oxidant and cooling air channels radiating outwards from the central manifold. With such a configuration oxidant and cooling air could be provided via a hole in the bottom end plate to the central manifold and exhausted from the outside of the fuel cell stack, or provided to the outside of the fuel cell stack and exhausted via the central manifold. In both such cases, the central manifold could be divided such that the oxidant air and cooling air are separated. Further, the external struts could be augmented by, or replaced with, a central strut within the central manifold. Such central strut could span and divide the central manifold for separation of the oxidant and cooling air. Alternatively such central strut could be hollow with separate internal bores for the oxidant and cooling air.

Although the embodiment shown in the drawings and described herein is an ambient-pressure fuel cell stack, it will be clear to those skilled in the art of fuel cell stacks that the invention can also be readily embodied in a high-pressure fuel cell stack.

The foregoing is a description of a preferred embodiment of the invention which is given here by way of example. The invention is not to be taken as limited to any of the specific features as described, but comprehends all such variations thereof as come within the scope of the appended claims.

What is claimed is:

1. A solid cage for containing a stack of fuel cells, comprising
    (A) a top end plate;
    (B) a bottom end plate;
    (C) at least two struts, each strut attached to the bottom end plate and the top end plate so as to fix the top and bottom end plates in a spaced-apart relationship, wherein the fuel cell stack can be disposed between the top and the bottom end plates, and between the struts;
    (D) a pressure plate disposed between the fuel cell stack and the top end plate;
    (E) jack screws and an array of horizontally-spaced threaded jack-screw holes through the top end plate, through which the jack screws are threaded for effecting a downward displacement of the pressure plate relative to the bottom end plate; and
    (F) vertically-compressible springs disposed between the jack screws and the pressure plate
    wherein, a compressive force to the fuel cell stack may be applied by downwardly displacing the pressure plate relative to the bottom end plate so as to apply a compressive force to the fuel cell stack as between the pressure plate and the bottom end plate.

2. The cage of claim 1, wherein the springs are dish springs.

3. The cage of claim 1, wherein the struts are L-shaped in horizontal cross-section so as to form vertically-extending inside corners, and the struts are attached to the bottom end plate and the top end plate such that the inside corners face the fuel cell stack and engage the vertical edge corners of the fuel cell stack, so as to prevent horizontal displacement of the fuel cell stack relative to the cage.

4. The cage of claim 1, further comprising electrically-non-conductive strut liners disposed between the struts and the fuel cell stack so as to electrically insulate the struts from the fuel cell stack.

5. The cage of claim 4, wherein the strut liners are sized and shaped to seal the space between the struts and the fuel cell stack so as to impede the passage of fluid therebetween.

6. The cage of claim 1, wherein the attachment between each strut and an end plate comprises:
(A) an attachment bolt;
(B) a horizontally-extending foot fixed to the end of the strut and having a vertically-extending hole through which the attachment bolt can be inserted; and
(C) a vertically-extending threaded receptacle in the end plate, into which the attachment bolt can be screwed;
wherein the strut is attached to the end plate by inserting the attachment bolt through the hole in the foot and screwing it into the threaded receptacle.

7. The cage of claim 6, wherein the foot and receptacle each have a vertically-extending internal-manifold opening, aligned one with the other for communicating with an internal manifold in the stack of fuel cells.

8. A solid cage for containing a fuel cell stack, comprising
(A) a top end plate;
(B) a bottom end plate; and
(C) four struts, each strut attached to the bottom end plate and the top end plate, and each strut is L-shaped in cross-section so as to form vertically-extending inside corners;
wherein, the inside corners of the struts mate with and are engageable with a vertical edge corner of the fuel cell stack, so as to prevent horizontal displacement of the fuel cell stack components relative to the cage.

9. The cage of claim 8, further comprising electrically-non-conductive strut liners disposed between the struts and the fuel cell stack so as to electrically insulate the struts from the fuel cell stack.

10. The cage of claim 9, wherein the strut liners are sized and shaped to seal the space between the struts and the fuel cell stack so as to impede the passage of fluid therebetween.

11. The cage of claim 8, wherein the attachment between each strut and an end plate comprises:
(A) an attachment bolt;
(B) a vertically-extending hole in the end plate through which the attachment bolt can be inserted; and
(C) a vertically-extending threaded socket at the end of the strut, into which the attachment bolt can be screwed;
wherein the strut is attached to the end plate by inserting the attachment bolt through the end plate and screwing it into the threaded socket.

12. The cage of claim 8, wherein the attachment between each strut and an end plate comprises:
(A) an attachment bolt;
(B) a horizontally-extending foot fixed to the end of the strut and having a vertically-extending hole through which the attachment bolt can be inserted; and
(C) a vertically-extending threaded receptacle in the end plate, into which the attachment bolt can be screwed;
wherein the strut is attached to the end plate by inserting the attachment bolt through the hole in the foot and screwing it into the threaded receptacle.

13. The cage of claim 12, wherein the foot and receptacle each have a vertically-extending internal-manifold opening, aligned one with the other.

14. A solid cage fuel cell stack comprising:
(A) a rectangular-parallelepiped stack of fuel cells, having:
(i) a pair of internal manifolds for providing fuel to, and exhausting fuel from, the fuel cell stack;
(ii) at least one opening on a first side of the fuel cell stack for providing oxidant to the fuel cell stack;
(iii) at least one opening on a second side of the fuel cell stack for exhausting oxidant from the fuel cell stack;
(iv) at least one opening on a third side of the fuel cell stack for providing cooling fluid to the fuel cell stack; and
(v) at least one opening on a fourth side of the fuel cell stack for exhausting cooling fluid from the fuel cell stack; and
(B) a cage containing the fuel cell stack and having:
(i) a top end plate
(ii) a bottom end plate;
(iii) means for fixing the top and bottom end plates in a spaced-apart relationship, said fixing means having vertically-extending inside corners that mate with and engage vertical edge corners of the fuel cell stack, wherein the fuel cell stack is disposed between the top and the bottom end plates, and between the fixing means;
(iv) a pressure plate disposed between the fuel cell stack and the top end plate; and
(v) means for effecting a downward displacement of the pressure plate relative to the bottom end plate;
wherein, a compressive force to the fuel cell stack may be applied by downwardly displacing the pressure plate relative to the bottom end plate so as to apply a compressive force to the fuel cell stack as between the pressure plate and the bottom end plate.

15. The solid cage fuel cell stack of claim 14 wherein the first and second sides of the fuel cell stack are opposite each other and the third and fourth sides of the fuel cell stack are opposite each other such that the general direction of flow of the oxidant is substantially perpendicular to the general direction of flow of the cooling fluid.

16. The solid cage fuel cell stack of claim 15 wherein the third and fourth sides are wider than the first and second sides.

17. The fuel cell stack of claim 16 further comprising:
(A) oxidant-gas channels, each opening to the first and second sides, and through which the oxidant passes when flowing from the first side to the second side; and
(B) cooling fluid passages, each opening to the third and fourth sides, and through which the cooling fluid passes when flowing from the third side to the fourth side.

18. The solid cage fuel cell stack of claim 14, wherein the means for fixing the top and bottom end plates in a spaced-apart relationship comprises at least two struts, each strut attached to the bottom end plate and the top end plate.

19. The cage of claim 18, wherein the struts are four in number, the attachment of each strut to the bottom end plate and top end plate being proximate to a discrete associated corner of the bottom end plate and top end plate, such that each strut is proximate to a vertical edge corner of the fuel cell stack.

20. The cage of claim 19, further comprising electrically-non-conductive strut liners disposed between the struts and the fuel cell stack so as to electrically insulate the struts from the fuel cell stack.

21. The cage of claim 20, wherein the strut liners are sized and shaped to seal the space between the struts and the fuel cell stack so as to impede the passage of fluid therebetween.

22. The cage of claim 18, wherein the attachment between a strut and an end plate comprises:
  (A) an attachment bolt;
  (B) a vertically extending hole in the end plate through which the attachment bolt can be inserted; and
  (C) a vertically-extending threaded socket in the end of the strut, into which the attachment bolt can be screwed;
  wherein the strut may be removably attached to the end plate by inserting the attachment bolt through the end plate and screwing it into the threaded socket.

23. The cage of claim 18, wherein the attachment between a strut and an end plate comprises:
  (A) an attachment bolt;
  (B) a horizontally-extending foot fixed to the end of the strut and having a vertically-extending hole through which the attachment bolt can be inserted; and
  (C) a vertically-extending threaded receptacle in the end plate, into which the attachment bolt can be screwed;
  wherein the strut is attached to the end plate by inserting the attachment bolt through the hole in the foot and screwing it into the threaded receptacle.

24. The cage of claim 23, wherein the foot and receptacle each have a vertically-extending internal-manifold opening, aligned one with the other for communicating with an internal manifold in the stack of fuel cells.

25. The cage of claim 14, wherein the means for effecting a downward displacement of the pressure plate comprises an array of horizontally-spaced adjustable spacers collectively located between and acting as an array of spacers between the top end plate and the pressure plate, each spacer being vertically adjustable so as to vary the distance between the pressure plate and the top end plate in the vicinity of such spacer.

26. The cage of claim 25, where in the adjustable spacers are jack screws, and wherein the top end plate has an array of threaded jack-screw holes, through which the jack screws are threaded so as to downwardly displace the pressure plate.

27. The cage of claim 26, wherein vertically-compressible springs are disposed between the jack screws and the pressure plate.

28. The cage of claim 27, wherein the springs are dish springs.

29. The cage of claim 14, wherein the means for effecting a downward displacement of the pressure plate comprises an expansion structure interposed between the top end plate and the pressure plate.

\* \* \* \* \*